(12) United States Patent
Tillotson

(10) Patent No.: US 7,889,328 B2
(45) Date of Patent: Feb. 15, 2011

(54) SYSTEM AND METHODS FOR DETECTING TURBULENCE BASED UPON OBSERVATIONS OF LIGHT SCINTILLATION

(75) Inventor: Brian Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 522 days.

(21) Appl. No.: 11/948,579

(22) Filed: Nov. 30, 2007

(65) Prior Publication Data

US 2009/0143988 A1 Jun. 4, 2009

(51) Int. Cl.
*G01P 3/36* (2006.01)
(52) U.S. Cl. .......................... 356/28; 356/337
(58) Field of Classification Search ............. 356/28, 356/28.5, 337, 342
See application file for complete search history.

(56) References Cited

U.S. PATENT DOCUMENTS

| | | | | |
|---|---|---|---|---|
| 5,159,407 | A * | 10/1992 | Churnside et al. | 356/499 |
| 5,343,287 | A * | 8/1994 | Wilkins | 356/141.3 |
| 6,496,252 | B1 * | 12/2002 | Whiteley | 356/121 |
| 7,592,955 | B2 * | 9/2009 | Tillotson et al. | 342/378 |
| 2005/0151961 | A1 * | 7/2005 | McGraw et al. | 356/121 |
| 2006/0121893 | A1 * | 6/2006 | Tillotson et al. | 455/431 |
| 2007/0069941 | A1 | 3/2007 | Pearlman et al. | |
| 2007/0073486 | A1 | 3/2007 | Tillotson et al. | |
| 2007/0077071 | A1 * | 4/2007 | Belenkiy | 398/130 |
| 2007/0256491 | A1 | 11/2007 | Tillotson et al. | |
| 2007/0274226 | A1 | 11/2007 | Tillotson | |

OTHER PUBLICATIONS

U.S. Appl. No. 11/155,176, filed Oct. 31, 2006, Tillotson, et al.
Cornman, et al., The Detection of Upper Level Turbulence Via GPS Occultation Methods.

* cited by examiner

*Primary Examiner*—Isam Alsomiri
(74) *Attorney, Agent, or Firm*—Tung & Associates

(57) ABSTRACT

Systems and methods are provided for detecting turbulent air located between a light source and an observer based upon the scintillation of light produced by the light source. An optical sensor associated with the observer is configured to receive the light and to produce an indication of the light. A processor is configured to quantify scintillation in the light and to identify turbulent air between the light source and the optical sensor based upon the scintillation. A feedback device provides a notification when turbulent air is identified. Light sources and optical sensors may be located on airborne platforms or on the ground, and information may be transferred between multiple observers.

24 Claims, 3 Drawing Sheets

SYSTEM AND METHODS FOR DETECTING TURBULENCE BASED UPON OBSERVATIONS OF LIGHT SCINTILLATION

TECHNICAL FIELD

The embodiments described herein generally relate to systems and techniques for detecting turbulence in the atmosphere. More particularly, the embodiments described herein relate to detecting turbulence by observing the scintillation of light from remote light sources.

BACKGROUND

Most air travelers have experienced turbulence at some point during flight. In addition to being uncomfortable for passengers, turbulence poses a threat of damage to aircraft, as well as a threat of injury to passengers and crew. Indeed, the United States Federal Aviation Administration (FAA) presently requires that aircraft experiencing severe turbulence undergo inspection prior to returning to service, and at least one source has estimated that turbulence costs US airlines over $100 million per year in expense and lost revenue. Avoiding turbulence, then, has economic benefits in addition to the obvious benefits in terms of comfort and safety.

At present, turbulent air lying in the path of an aircraft is relatively difficult to identify. Various turbulence detection systems based upon Doppler radar or lidar have met with some success, but these systems are generally based upon radio frequency reflections off of particulate matter in the air, so their use is limited at many cruising altitudes that are above cloud layers and that are relatively free of dust or other particulates. Other systems that rely upon pilot reports (PIREPS) or automatic reporting from accelerometers on board existing aircraft can be beneficial as well, but these techniques are inherently unable to predict turbulence in areas where an aircraft has not previously experienced turbulent air. More recently, some attempts have been made to predict turbulent air using variations in global positioning system (GPS) signals. These systems, while effective in many settings, are presently quite expensive, and they are not typically intended to detect close range turbulence (such as wake turbulence generated by other aircraft). As a result, there remains a need and a desire for a turbulence detection system that is capable of effectively identifying various types of turbulence (including close range turbulence and clear air turbulence) without requiring an aircraft to venture into the turbulent airspace.

BRIEF SUMMARY

One embodiment provides a system for detecting turbulent air located between a light source and an observer. An optical sensor associated with the observer is configured to receive light from the light source and to produce an indication of the light. A processor is configured to receive the indication of the light, to quantify scintillation in the light based upon the indication, and to identify turbulent air between the light source and the optical sensor based upon the scintillation in the light. A feedback device such as a display or radio transmitter is configured to provide a notification to a pilot or other user when turbulent air is identified.

Another embodiment provides a method of detecting turbulent air located between a light source and an observer. Light is received from the light source, and scintillation in the light is quantified. Turbulent air between the light source and the observer is identified based upon the quantified scintillation in the light, and a notification is provided when turbulent air is identified.

In yet another embodiment, a system for detecting turbulent air comprises a light source configured to produce a light, and a light observer system. The light observer system comprises an optical sensor configured to receive the light from the light source and to produce an indication of the light. A processor is configured to receive the indication of the light, to quantify scintillation in the light based upon the indication, and to identify turbulent air between the light source and the optical sensor based upon the quantified scintillation in the light. A feedback device provides a notification when turbulent air is identified.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
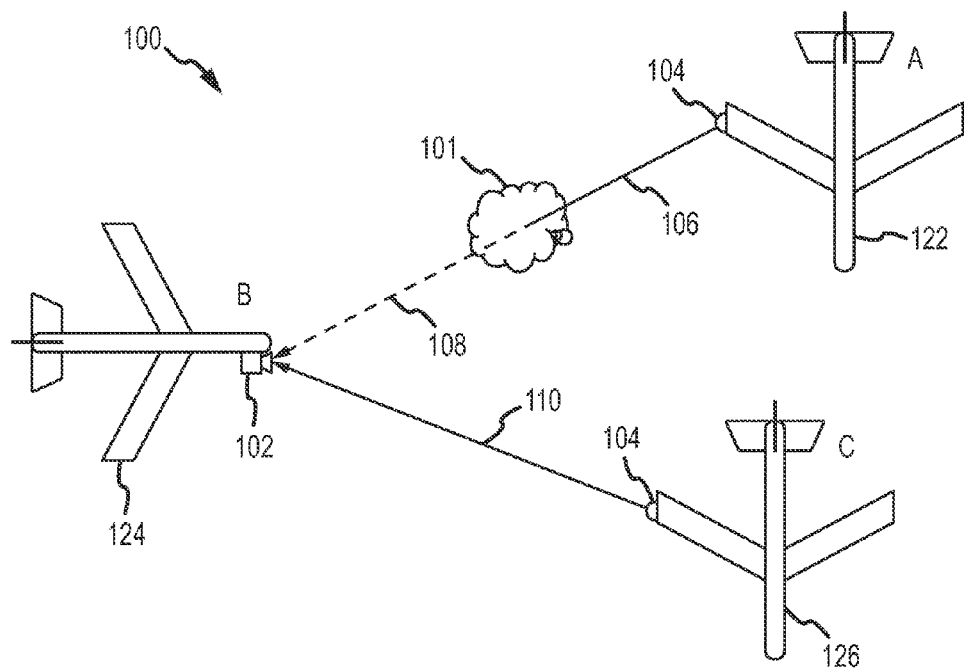
FIG. 1 is a diagram of an exemplary turbulence detection system.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

When light passes through the earth's atmosphere, differences in air density that can cause turbulence can also affect the amplitude and/or frequency of the light, thereby giving the light a scintillating appearance. Like stars "twinkling" in the night sky, lights observed though turbulent air have detectible scintillations that are generally not found in light passing though relatively calm air. By observing and quantifying this scintillation, then, turbulence can be remotely detected in clear air without the need for an aircraft to experience the turbulence firsthand. Further, because light has a relatively short wavelength compared to, say, radio frequency (RF) waves, light can detect turbulence with fairly high sensitivity, and at relatively close range. This can be particularly useful in detecting wake turbulence created by another aircraft, for example.

The general concept of detecting turbulence based upon observed scintillation in light passing though the turbulent region can be applied in a number of different settings. Aircraft, for example, could be assigned light sources and/or sensors that interact with remotely-located ground and/or air-based sources and sensors in any manner. An aircraft may contain an optical sensor system, for example, that is able to detect turbulence occurring in proximity to the aircraft by sensing scintillations in light produced from other aircraft or any other remote light sources, including light sources located on the ground. In other embodiments, ground or air based sensors identify turbulence based upon lights observed from aircraft operating within the view of the sensors. In still other embodiments, a network of lights and light sensors could be deployed in any manner, and information gathered by the network can be disseminated to aircraft or other users. Various exemplary embodiments are described with respect to the drawing figures below, and other embodiments may be equivalently formulated using the general concepts set forth herein.

With reference to FIG. 1, an exemplary system 100 for detecting turbulence 101 suitably includes an optical sensor 102 capable of detecting light 108, 110 arriving from one or more remotely-located light sources 104. Generally speaking, light 106 emanating from light source 104 on platform A will be affected by turbulent air 101, creating a scintillating effect in light 108 arriving at sensor 102. Light 108, then, will appear to have variations in magnitude and/or frequency that will not be present in light 110, which only passes through stable air on the path from platform C to sensor 102. Scintillation due to turbulence 101 can be identified through comparisons to other light, through changes in the received light observed over time, through comparisons to known scintillation patterns, and/or through other techniques as appropriate.

Light sources 104 are any devices capable of emitting light in the visible or near visible (e.g. infrared or ultraviolet) spectrum. In various embodiments, light sources can be specialized lights deployed for the primary purposes of detecting turbulence. In other embodiments, however, currently-deployed light sources 104 can be used. To that end, various lights used on aircraft (e.g. landing lights, running lights) could be detected at sensor 102, and scintillation observed in the received light could be used to detect turbulence 101. Xenon or other halogen strobe lights that are widely deployed on existing aircraft, for example, can provide suitably detectable light for many embodiments. These lights are relatively bright (e.g. on the order of 400,000 candles or so) and exhibit wide spectral characteristics. In other embodiments, however, light with a relatively narrow spectral width (or even monochromatic light) could be used, as described more fully below. Light emitting diodes (LEDs) or laser diodes, for example, could be used to generate light with a relatively narrow spectral width suitable for certain embodiments. Lights may be deployed in isolation, or in pairs, triplets and/or other combinations in embodiments (described more fully below) that include range detection. Light sources 104 are not limited to those described herein, and any other airborne or land-based lights or other sources 104 could be used in a wide array of other embodiments.

FIG. 1 shows light sources 104 deployed on aircraft platforms A 122 and C 126, and optical sensor 102 deployed on an aircraft platform B 124. These platforms 122, 124, 126 would typically be moveable with respect to each other; locations of turbulence 101 could therefore be ascertained from the relative positions of platforms 122, 124, 126. These positions may be exchanged via RF communications and/or the like. In various embodiments, aircraft 122, 124, 126 are able to know the relative positions of each other though the exchange of GPS coordinates, air traffic control (ATC) information, transponder data, traffic collision avoidance system (TCAS) signals and/or the like. In other embodiments, either light source 104 or sensor 102 may be ground based. Ground-based lights (e.g. lights in proximity to a runway, airfield, aircraft carrier, and/or other point of reference) may be used as sources 104, for example. Also, note that the direction that light travels though turbulence 101 is not generally important to the resulting scintillations, meaning that the relative positions of sensor 102 and source 104 could be interchanged. Other embodiments could therefore be formed wherein the light detector was airborne and the detector was ground based, or vice versa.

Figure 2:
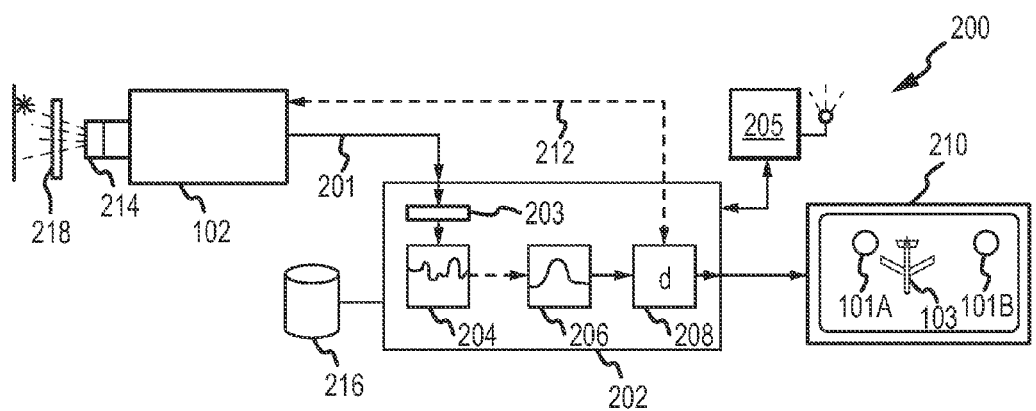
FIG. 2 is a block diagram of an exemplary system for detecting turbulent air.

With respect now to FIG. 2, an exemplary system 200 for detecting turbulent air 101 suitably includes any sort of optical sensor 102, processor 202 and feedback device 210. Light from a remote source 104 is detected by optical sensor 102, and a signal 201 indicative of the light is provided from sensor 102 to processor 202. Processor 202 applies any sort of digital processing techniques to signal 201 (which may be received over an appropriate period of time) to identify turbulence 101 based upon scintillation of light passing through the atmosphere. If turbulence 101 is detected, a report can be provided to a pilot or other user via any sort of feedback device 210, which may include a video display, audio speaker, radio transceiver and/or any other type of output features. Processor 202 may also interact with any sort of database 216, radio transceiver 205 and/or other devices as appropriate.

Optical sensor 102 is any device capable of receiving optical energy from remote light sources 104. In various embodiments, optical sensor 102 is any sort of digital or analog camera capable of obtaining still or moving images that include views of remote light sources 104. Sensor 102 may be a conventional video camera, for example, capable of obtaining multi-pixel images in any format and at any resolution. In such embodiments, signal 201 may include the pixilated images obtained from camera 102, and/or any other digital or analog data as appropriate. In other embodiments, however, signal 201 is any signal capable of indicating a brightness or intensity of one or more light sources 104. Sensor 102 may also include a telescoping lens 214 and/or other optics suitable to improve the focus or resolution of the imagery produced. An optical filter 218, for example, may be provided to filter incoming light in any manner. Such optics (as well as the spatial orientation of the camera or other sensor 102) may be adjusted in response to one or more control signals 212 from processor 202, as appropriate.

Processor 202 is any signal processor, controller, microprocessor and/or other processing device or system that is capable of receiving indications 201 of received light, of quantifying the amount of scintillation identified in the received signals, of identifying turbulent air based upon the quantified scintillation in the light, and initiating feedback to a pilot or other user when turbulence is identified. In various embodiments, processor 202 is implemented using conventional digital signal processing systems, including a suitable microprocessor and associated digital memory and input/output features. In such embodiments, the control features and other functions carried out by processor 202 may be executed in response to computer-executable software or firmware instructions stored in digital memory (e.g. any sort of read-only, random access, flash or other memory as appropriate). Data may be similarly stored and processed in any appropriate digital format.

Processor 202 identifies turbulent air based upon data contained within received signals 201. In various embodiments, processor 202 and/or any other control circuitry are able to interact with the environment to enhance the basic functionality of the system. Processor 202 may interact with a database 216, for example, which may be a conventional geographic information system (GIS) or similar database, to obtain information about particular light sources 104 as appropriate. Information stored in database 216 may include location information about the light source, and/or may include information about the light source itself such as a frequency or wavelength of emitted light, information about a modulation parameter (e.g. a modulation technique or frequency), information about the field of view associate with the light source (e.g. the directions or portions of the sky that are capable of viewing the particular light source) and/or any other information. Processor 202 may also interact with a radio transmitter and/or receiver 205 to transmit information about detected turbulence 101 and/or to obtain information about remote light sources 104 as appropriate. Radio transceiver 205 may be any conventional RF transmitter/receiver, such as an automatic dependent surveillance broadcast (ADS-B) radio, a satellite radio, an aircraft communication addressing and reporting system (ACARS), and/or the like.

Feedback device 210 is any device, system or module capable of providing feedback to a pilot or other system user when turbulence 101 is detected. To that end, feedback device 210 includes any sort of warning light, video display, audio speaker and/or other output device capable of providing a turbulence warning to the user. In other embodiments, feedback device is a radio transceiver (which may or may not correspond to receiver 205) capable of broadcasting or otherwise transmitting information about detected turbulence to an aircraft or other recipient.

In the exemplary embodiment illustrated in FIG. 2, feedback device is a video display capable of providing a graphical representation of pockets of turbulence 101A-B detected in relation to an aircraft 103. In such embodiments, light is observed in various directions with respect to the aircraft platform. Scintillating light reaching (or emanating from) the aircraft can be correlated with turbulent airspace and displayed on device 210 as appropriate. Device 210 can be implemented in a dedicated display, and/or may be integrated into an existing or other conventional cockpit display such as a Doppler radar/lidar display, a flight management system (FMS) display, and/or the like. In various embodiments, the "turbulent air" display is simply one setting on a multi-function display that may also display radar or other weather-related information, as well as graphical flight planning and/or other mapping information as appropriate. Turbulence data could also be displayed in a head-up display (HUD), a helmet-mounted display, a bolt-on display or the like. Turbulence data may be displayed in any level of detail. In various embodiments, the magnitude of the scintillation is indicated (e.g. with color, image density, and/or any other display parameter) when turbulence is indicated. Further, airspace that has been evaluated and found to be clear of turbulence may be indicated in a different manner from airspace that has not been evaluated. In other embodiments, however, feedback provided by device 210 may be as simple as a warning light, audio signal and/or other indication of "turbulence ahead" when scintillating light is detected in the intended path of the aircraft.

Turbulence may be detected from scintillating light in any manner. In various embodiments, software or firmware executing within processor 104 is able to process incoming signals 201 from optical sensor 102 to arrive at suitable output signals used to drive feedback device 210 as desired. The various functions carried out by processor 202 may be arranged into logical steps or modules in any manner. In the exemplary embodiment shown in FIG. 2, for example, a digital filter 203 is able to extract desired optical signals from background imagery using any appropriate technique. In various embodiments, digital filter 203 is tuned to any signal characteristic known to match turbulent scintillation, as described in additional detail below. Optical filtering may also assist in improving the signal to noise ratio of signal 201. In embodiments wherein the spectral width of the light source 104 is known to be relatively narrow, for example, optical filter 218 can be used to eliminate light outside of that known spectra, thereby improving the signal to noise ratio (SNR) of the received signals 201. Light sources 104 may be identified and isolated in images or other signals 201 provided by sensor 102 in any manner, and various electronic and/or optical filtering techniques are described in additional detail below.

Other processing modules are able to direct processor 104 to carry out other tasks in detecting turbulence 101. Module 204, for example, contains software or firmware instructions for quantifying the scintillation of light contained within received signals 201. Module 206 contains software or firmware instructions for identifying turbulence from the quantified scintillation. In embodiments that include range finding capability, module 208 may include instructions for determining the distance to any identified turbulence 101. Again, the various programming and logical modules used in a practical embodiment may be organized in any manner, with tasks and features being shared between programming modules and routines in any way. Exemplary techniques for carrying out the functions of modules 204, 206, and 208 are described below with respect to FIGS. 3, 4, and 5-6, respectively.

Figure 3:
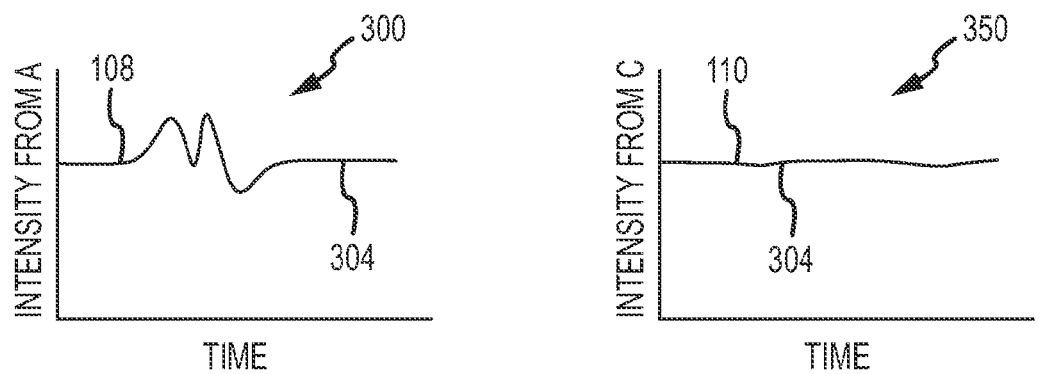
FIG. 3 contains plots of two exemplary light intensities observed over time.

FIG. 3 shows exemplary plots 300, 350 of light intensities 304 from two remote light sources 104 observed over time. Plot 300, for example, corresponds to the exemplary intensity of light 108 received from the light source 104 associated with aircraft 122 in FIG. 1, whereas plot 350 shows the intensity of light 110 received from light source 104 associated with aircraft 126 in FIG. 1. In this example, light 108 has periods of fluctuating intensity over time, corresponding to the scintillation caused by the light passing through turbulent air 101. Light 110, in comparison, exhibits much less intensity variation over time, reflecting less scintillation, and therefore more stable air. The amount of variation in intensity 304, then, can be used to quantify the amount of scintillation in the light received from the remote light source 104.

Figure 4:
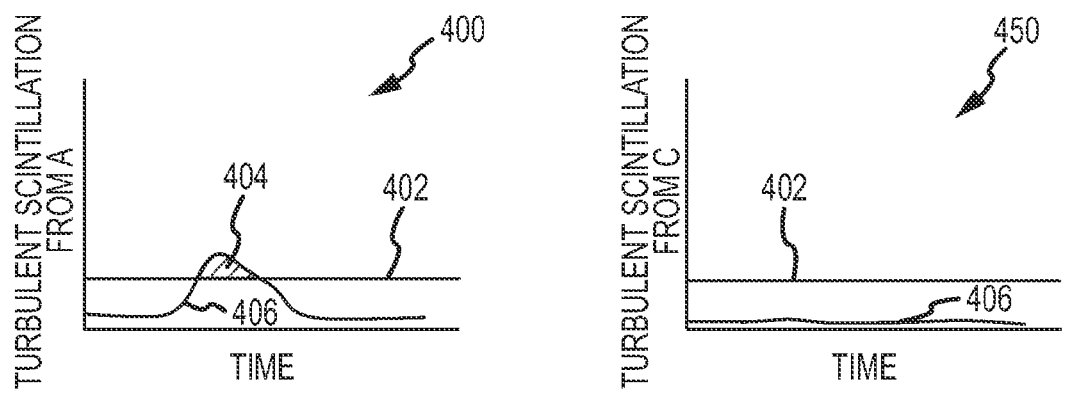
FIG. 4 contains plots of two exemplary representations of turbulent scintillation over time.

FIG. 4 shows two plots 400, 450 of quantified scintillation 406 over time. Plot 400 generally corresponds to the exemplary plot 300, and plot 450 continues the example of plot 350 described above. In one embodiment, the quantified scintillation 406 shown in the plots 400, 450 may simply be the first derivative of the time series data 304 described above. By comparing the quantified scintillation 406 to an acceptable threshold 402, scintillation that exceeds an acceptable level can be readily identified. In various embodiments, then, turbulence 101 can be assumed to be present when the quantified scintillation exceeds an acceptable threshold 402. Threshold level 402 may be determined in any manner, for example from empirical data or from observing known turbulent areas. In some embodiments, any observation of scintillation 406 that is greater than threshold 402 can be assumed to represent turbulent air; in other embodiments, the behavior of scintillation 406 can be observed over time to improve the accuracy of results. In such embodiments, the integral of data 406 can be compared to a second threshold level such that turbulence is assumed when the area 404 exceeds a threshold level. This will tend to eliminate spurious results that do not continue over time (and could therefore otherwise result in false positive diagnoses), yet will allow periods of very high scintillation to be identified very quickly. Note that by comparing plot 400 to plot 450, the amount of scintillation in plot 400 (corresponding to light 108 arriving through turbulence 101 in FIG. 1) can be readily discerned from the low-levels of scintillation occurring in light 110 (FIG. 1).

Equivalent embodiments may detect turbulence in a more advanced manner. As light from any source 104 of interest is received over time, for example, the intensity variation observed can be fed to a fast Fourier transform (FFT) or other time-to-frequency domain conversion algorithm to obtain a resulting power spectrum for the received light. This spectrum can be compared to spectra produced from known turbulence (which generally produce spectra having log-normal distributions) or other sources as appropriate to detect scintillation that is indicative of turbulence. Turbulence spectra may vary based upon such factors as the range to the light source, the relative velocity of the light source, the characteristics of the light sensor and the turbulent air mass, the wavelength of light, and the distance and intensity of the turbulence. If many of these values are known, however (e.g. in the case of a light source with known optical characteristics and a known location with respect to the sensor), then the characteristics of the turbulent air mass can be deduced.

Other techniques for detecting turbulence based upon the scintillation of light could also be used. In another equivalent embodiment, two or more time series of intensity measurements are obtained from two different light sources 104 (or from a common light source 104 to two different sensors 102), and the temporal shift that gives the maximum correlation between the two signals is computed. The strength and width of the correlation peak can be further computed, with the resulting data used to estimate the range, magnitude and/or thickness of a turbulent region 101. Again, any technique for correlating scintillation in observed light to turbulent air can be used in any number of alternate but equivalent embodiments.

Figure 5:
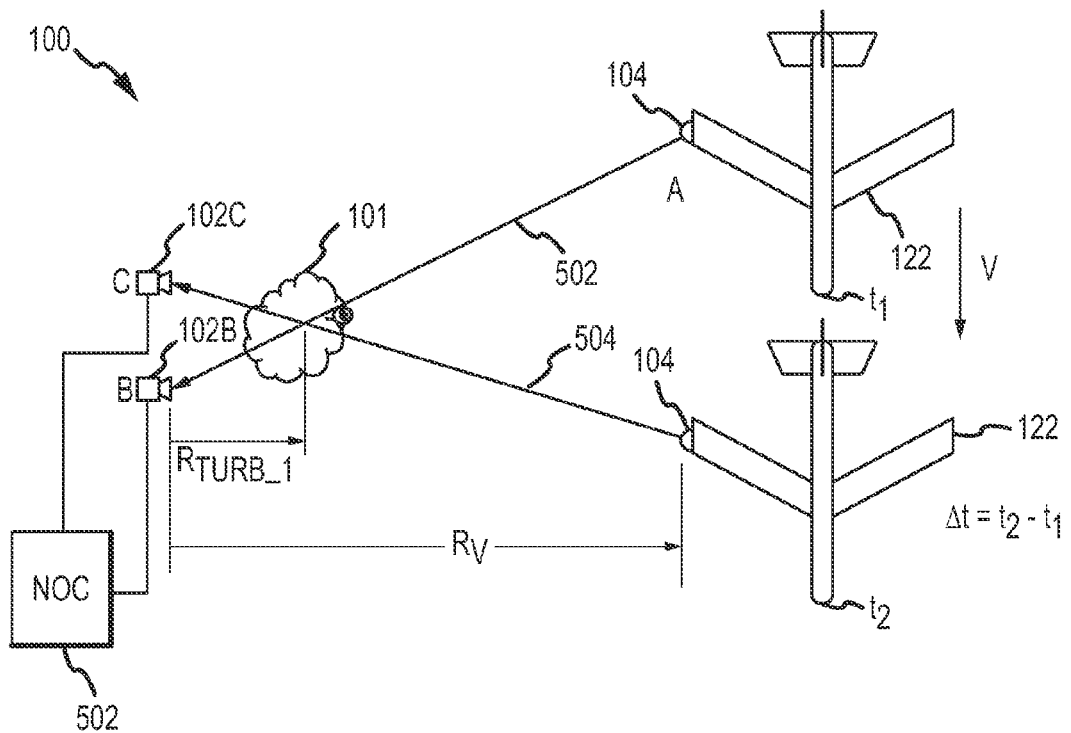
FIG. 5-6 are diagrams showing an exemplary technique for identifying a distance from a light observer to a pocket of turbulence.
Figure 6:
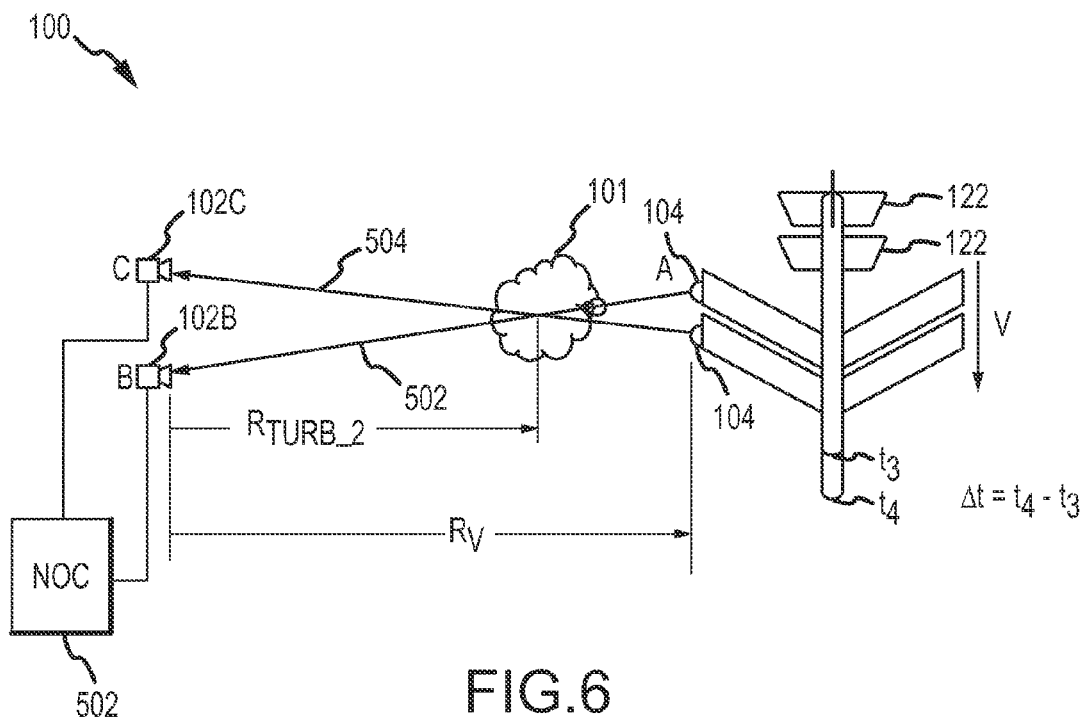

In addition to determining the direction of turbulent air 101, various embodiments are able to estimate the range to the identified turbulent mass as well. Range data may be particularly useful in embodiments that provide two or three dimensional displays of turbulence data, such as the display 210 shown in FIG. 2. With reference now to FIGS. 5-6, an exemplary technique for determining the range to a turbulent air mass 101 uses trigonometry to identify the range to a turbulent air mass 101 that lies between a light source 104 and a pair of detectors 102B-C. Note that equivalent concepts would apply to an embodiment having one detector 104 mounted on a moving platform (e.g. aircraft 122) that detects light from two remote sources 102. That is, the direction that light travels from source to detector through the turbulent mass is not relevant to the detection of turbulence or the estimation of range. Generally speaking, the location of a turbulent airmass can be estimated from the time difference in detecting scintillation in two different light vectors 502, 504. In FIG. 5, for example, sensor 102B will initially detect scintillation in vector 502 from source 104 at time $t_1$, whereas sensor 102C will not detect scintillation in vector 504 until aircraft 122 advances in space at time $t_2$. The difference in time ($\Delta t$), along with the positions or velocity of aircraft 220, can be used to triangulate the location of the turbulence 101. That is, the point that vectors 502 and 504 cross can be assumed to be the location of the turbulence 101, and this location can be ascertained by comparing the distance traveled by the aircraft 122 to the distance between the two sensors 102B-C. If the distances are approximately equal, for example, then the turbulence 101 can be assumed to be approximately midway between the aircraft 122 and the sensors 102. To that end, if the distance traveled by the aircraft between the two vectors 502 is significantly greater than the distance between sensors 102B-C (as in FIG. 5), then turbulence 101 can be ascertained to be closer to the sensors 102 than to the aircraft 122. Conversely, if the distance traveled by the aircraft 122 is less than the distance between the sensors 102 (as in FIG. 6), then the turbulence 101 can be deduced to be closer to the aircraft 122 than to sensors 102.

Other techniques could also be used to determine position or distance to turbulence 101. When the relative locations of sensor 102 and light source 104 are known, for example, it can be readily concluded that any turbulence indicated in scintillating light from source 104 lies between the two known locations. In a further embodiment, measurements between multiple aircraft or other platforms operating within a known space can be fused together using conventional tomography techniques or the like to further estimate locations of turbulence, particularly in crowded areas (e.g. near airports). In other embodiments, the variations in spectral characteristics of scintillating light can be correlated to the range of the turbulence 101, and/or other techniques could be applied. In still other embodiments, paths of recent flights can be assumed to be starting points of wake turbulence. Again, any technique for ascertaining the range or position of turbulence 101 may be used in any number of equivalent embodiments.

Returning again to FIG. 2 momentarily, processor 202 contains suitable processing logic for identifying scintillation in light received at sensor 102 (e.g. module 204), as well as for recognizing turbulence based upon the quantified scintillation (e.g. module 206). Logic for identifying range and/or direction of the identified turbulent air may also be provided (e.g. module 208). In various embodiments, the basic features may be supplemented as appropriate to improve sensitivity or SNR, or to otherwise improve the performance of system 100.

For example, detecting particular light sources 104 during daytime or in locations with much ambient light (e.g. over cities) can be challenging. Modulating the light source, however, can make detection much easier. In such embodiments, light would typically be intensity modulated at a frequency that is greater than the scintillations caused by turbulence; a frequency on the order of a kilohertz or so, for example, would be readily distinguishable from turbulent scintillation. The modulation frequency could also be selected to be readily distinguishable from flickering caused by an AC power grid; this flicker is typically at a rate approximately equal to twice the grid frequency (e.g. 120 Hz in North America, 100 Hz in Europe). Demodulation could take place within optical sensor 102, or in processor 202 (e.g. in filter 203) as appropriate. That is, processor 202 may be responsive to the modulation frequency, and may measure scintillation in such embodiments as variation in the modulation amplitude. This modulation could help remove effects of unmodulated light (e.g. daylight, moonlight, terrestrial lights), thereby greatly improving the SNR of system 200.

Another embodiment with improved SNR would use the strobe lights already present on many aircraft as light sources 104. These strobes typically flash at a rate of about 0.5 Hz or so, with each flash lasting on the order of a few microseconds. While the exact parameters could be varied in any manner, flashes could be measured at the strobe frequency and brightness variation between flashes could be used as an indication of scintillation (after correcting for inherent variability of flashes produced by the strobe). Using aircraft strobe lights as light sources 104 would allow for ready computation of distance and location of any identified turbulence, since locations of nearby aircraft are readily available using, for example, radio communications 205 or the like. Using the flashing strobes as light sources would benefit the SNR ratio of the system by not only concentrating energy into brief flashes of light, but also by providing a ready mechanism for removing noise created by other sources of light.

In still other embodiments, light can be produced by certain light sources 104 at a known wavelength spectrum, which can be designed to be relatively narrow. Monochromatic or near-monochromatic light can be produced by laser diodes or other sources 104 as appropriate. Light received at sensor 102 can be filtered (e.g. by optical filter 218) to remove light lying outside of the spectrum of interest, thereby suppressing other sources of light and easing detection of the light source 104 of interest. The particular wavelength(s) of light can be designed in any convenient manner. The wavelengths may be selected to be "eye safe" (e.g. at a wavelength that does not penetrate the human eye) for safety, for example.

Moreover, the wavelengths of interest may be selected to lie within relatively narrow absorption bands of the solar spectrum for even better detectability. Light produced at a wavelength of about 589 nm, for example, would lie within the sodium D2 line of the solar spectrum, thereby easing detection of generated light. Light could be produced at this wavelength using conventional low-pressure sodium bulbs, or the like. In this embodiment, optical filter 218 would be tuned to pass only light lying within a narrow range encompassing 589 nm, thereby suppressing daylight and many other sources of optical "noise". To that end, optical filter 218 may be adjusted and/or selectively deployed as appropriate for the embodiment, the light source 104, and the sensor 102.

In further embodiments, optical filter 218 and/or electronic filter 203 may apply different types of filters at different times to improve the detectability of certain light sources 104. The 589 nm optical filter could be applied when the light source 104 is known to be a sodium lamp (e.g. from information in database 216), but other filters could be applied when light source 104 is known to be a different sort of lamp, or is an unknown source of light. Still further, different filters 203 and/or optical filters 218 could be applied to a single image to determine which filter (if any) provides the greatest resolution. Various color filters could be applied, for example, to determine which best matches the color of light produced by one or more light sources 104. Other filters or enhancements may be applied elsewhere in system 200. In embodiments wherein sensor 102 is a color camera, for example, signal processing 204 may select whether to use one, two or all three color combinations for best SNR.

Information sharing between turbulence detection systems 200 may further improve usefulness and accuracy of data. Data may be shared through digital or analog communications, such as RF communications exchanged via radio transceiver 205 or the like. As noted above, each light receiving platform may simply report the detection of turbulence to air traffic control (ATC) and/or to aircraft operating in the vicinity. Such information may be transmitted in any manner, with turbulence identified by general vicinity, by approximate coordinates (e.g. latitude/longitude/altitude or the like), or in any other manner.

Platforms (e.g. aircraft 122 and 126 in FIG. 1) for light sources 104 may also report position, velocity and/or orientation information as appropriate to assist light sensors 102 in obtaining accurate data from emitted light. In embodiments wherein the light source 104 is a landing light, for example, the brightness of the light is at least partially dependent upon the orientation of the aircraft toward the detector (that is, the landing light is brighter if the aircraft heading is aligned with the detector than if the heading is not aligned). Transmitting the orientation of the light-carrying platform, then, can help the sensor 102 calibrate itself to an expected level of received light.

Light-carrying platforms could also transmit current position information to further assist sensing systems 200, as noted above. Position information can be useful not only in calculating location or range of identified turbulence 101, but also in calibrating sensing electronics (e.g. a light source 104 would be expected to be brighter at closer range than at a greater range). Position information can also assist signal processing electronics 204 in locating the light source 104 within the field of view of imagery 201 obtained from sensor 102. Signal processing electronics 204 could further exploit the knowledge of the position of light source 104 with respect to sensor 102 by directing (e.g. using signals 212) sensor 102 to focus on the particular source 104. This focusing can be through re-orientation of the camera itself, through improved focus using filter 218, through any other lenses that may be present, and/or though telescoping of lens 214 as appropriate. Further, light sources 104 could be activated when light sensors 102 are focused on the source 104 and/or are in the vicinity of source 104; these light sources could be deactivated to conserve power and bulb life when no sensors 102 are in range of the light source. Light activation/deactivation could be negotiated directly between light sources 104 and sensors 102, or a central network operating center (e.g. NOC 502 in FIGS. 5-6) could coordinate such features.

In still other embodiments, NOC 502 or another central processing source is able to coordinate information received from multiple optical sensors 102. Such information may be useful in estimating range to a turbulent air mass, for example. Further embodiments could use additional data transmitted by platforms carrying light sources 104 and/or sensors 102. If an aircraft reports that its strobes are off, but that its running lights are on and that its location and orientation imply that the left wingtip is pointed toward a particular sensor 102, then sensor 102 may not need to exert effort to identify strobe flashes, and in fact the optical filter 218 in the sensor system 200 may select a red filter to ease detection of red lights, since the light on the left wingtip can be assumed to be red (as opposed to green) in color. This information may be coordinated at NOC 502, and/or negotiated directly between platforms as appropriate.

Again, the various features and aspects described herein may be selected and arranged in any manner to arrive at any number of embodiments that are each capable of detecting turbulence based upon the apparent scintillation in light passing through the turbulent air.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system for detecting turbulent air located between a light source and an observer, the system comprising:
    an optical sensor associated with the observer that is configured to receive light from the light source and to produce an indication of the light;
    a processor configured to receive the indication of the light, to quantify scintillation in the light based upon the indication, and to identify turbulent air between the light source and the optical sensor based upon the scintillation in the light, said quantification of said light scintillation comprising quantifying a change in intensity of said light from said light source with respect to time; and
    a feedback device configured to provide a notification when turbulent air is identified.

2. The system of claim 1 wherein the optical sensor is a video camera comprising a telescoping lens, and wherein the processor is further configured to direct the adjustment of the telescoping lens to focus the lens on the light source.

3. The system of claim 1 wherein the processor is further configured to communicate with a database comprising information about the light source, and wherein the information comprises at least one of a location of the light source and a field of view associated with the light source.

4. The system of claim 1 wherein the processor is further configured to communicate with a database comprising information about the light source, and wherein the information comprises at least one of the set comprising:
- a wavelength of light produced by the light source,
- a modulation parameter associated with the light source, and
- a brightness of the light produced by the light source.

5. The system of claim 1 wherein the feedback device is a display configured to present a graphical representation of the turbulent air.

6. The system of claim 1 further comprising an optical filter tuned to a wavelength of the light produced by the light source and configured to filter light input to the optical sensor.

7. The system of claim 1 further comprising a digital filter tuned to signal characteristics matching turbulent scintillation and configured to filter an output of the optical sensor.

8. A method of detecting pockets of turbulent air located between a light source and an observer, the method comprising the steps of:
- receiving a light from the light source;
- quantifying scintillation in the light, said quantification of said light scintillation comprising quantifying a change in intensity of said light from said light source with respect to time;
- identifying turbulent air between the light source and the observer based upon the quantified scintillation in the light; and
- providing a notification when turbulent air is identified.

9. The method of claim 8 wherein the quantifying step comprises identifying variations in a brightness of the light between flashes of the light.

10. The method of claim 8 wherein the identifying step comprises comparing the quantified scintillation to a threshold level of scintillation.

11. The method of claim 8 wherein the identifying step comprises comparing the quantified scintillation to a known spectral characteristic of a turbulence phenomenon.

12. The method of claim 8 further comprising the step of determining the position of the light source from a received radio signal.

13. The method of claim 8 further comprising the step of determining a distance to the turbulent air based upon a location of the light source.

14. The method of claim 8 further comprising the step of determining a distance to the turbulent air based upon a time difference occurring between two different observations of scintillating light.

15. The method of claim 14 wherein the two different observations are taken based upon light emanating from two different light sources.

16. The method of claim 14 wherein the two different observations are taken from two different optical sensors with respect to a common light source.

17. A system for detecting turbulent air comprising:
- a light source configured to produce a light; and
- a light observer system comprising:
  - an optical sensor configured to receive the light from the light source and to produce an indication of the light;
  - a processor configured to receive the indication of the light, to quantify scintillation in the light based upon the indication, and to identify turbulent air between the light source and the optical sensor based upon the quantified scintillation in the light, said quantification of said light scintillation comprising quantifying a change in intensity of said light from said light source with respect to time; and
  - a feedback device configured to provide a notification when turbulent air is identified.

18. The system of claim 17 wherein one of the light source and the light observer is associated with an airborne platform and the other of the light source and the light observer is associated with a ground based platform.

19. The system of claim 17 wherein both the light source and the light observer are associated with airborne platforms.

20. The system of claim 17 wherein the light source is selected from the group consisting of: a halogen strobe light, an aircraft landing light, an aircraft running light, a light emitting diode, a laser diode, and a substantially monochromatic source tuned to a solar absorption band.

21. The system of claim 17 wherein the light source is located in proximity to a runway and is oriented in a direction visible to aircraft approaching the runway.

22. The system of claim 17 wherein the light from the light source is modulated, and wherein the light observer system is further configured to detect the modulated light.

23. The system of claim 17 wherein the light from the light source is generated within a substantially narrow spectral width, and wherein the light observer system is further configured to filter the light input to the optical sensor to allow a portion of the light that lies within the substantially narrow spectral width to reach the optical sensor.

24. The system of claim 17 further comprising an operations center in communication with the light observer system, wherein the operations center is configured to gather notifications and to transmit turbulence information based thereon to aircraft operating in the vicinity of the light observer system.

* * * * *